(12) United States Patent  (10) Patent No.: US 6,715,074 B1
Chaiken  (45) Date of Patent: Mar. 30, 2004

(54) VIRUS RESISTANT AND HARDWARE INDEPENDENT METHOD OF FLASHING SYSTEM BIOS

(75) Inventor: Craig L. Chaiken, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/362,077

(22) Filed: Jul. 27, 1999

(51) Int. Cl.[7] .............................................. G06F 11/30
(52) U.S. Cl. ...................... 713/164; 713/615; 713/187; 713/168; 713/193; 713/189; 380/285; 705/76; 705/57
(58) Field of Search ................ 713/164, 165, 713/166, 167, 187, 168, 200, 2, 1, 100, 189, 193; 714/6, 36, 11; 711/100, 103, 102, 104, 163; 705/76, 57; 380/285

(56) References Cited

U.S. PATENT DOCUMENTS

| | | | | |
|---|---|---|---|---|
| 5,717,886 A | * | 2/1998 | Miyauchi | 711/103 |
| 5,768,598 A | * | 6/1998 | Marisetty et al. | 710/260 |
| 5,778,070 A | * | 7/1998 | Mattison | 713/191 |
| 5,835,761 A | * | 11/1998 | Ishii et al. | 713/100 |
| 5,859,911 A | * | 1/1999 | Angelo et al. | 713/187 |
| 5,930,504 A | * | 7/1999 | Gabel | 713/2 |
| 5,974,250 A | * | 10/1999 | Angelo et al. | 713/100 |
| 6,014,611 A | * | 1/2000 | Arai et al. | 702/132 |
| 6,233,681 B1 | * | 5/2001 | Kang | 713/2 |
| 6,243,656 B1 | * | 6/2001 | Arai et al. | 702/132 |
| 6,363,463 B1 | * | 3/2002 | Mattison | 711/164 |
| 6,425,079 B1 | * | 7/2002 | Mahmoud | 713/2 |
| 6,510,521 B1 | * | 1/2003 | Albrecht et al. | 713/193 |
| 6,513,159 B1 | * | 1/2003 | Dodson | 717/178 |
| 6,571,206 B1 | * | 5/2003 | Casano et al. | 703/25 |
| 6,581,162 B1 | * | 6/2003 | Angelo et al. | 713/193 |

FOREIGN PATENT DOCUMENTS

| | | |
|---|---|---|
| WO | WO 97/29569 | 8/1997 |
| WO | WO 98/15082 | 4/1998 |

* cited by examiner

Primary Examiner—Ly V. Hua

(57) ABSTRACT

A system and method for making sure that before the ROM BIOS of a personal computer is reprogrammed, the BIOS image is compatible with the computer whose BIOS are being reprogrammed. This is done by requiring the utility that performs the reprogramming of the ROM BIOS to have a secure portion of code that is stored in a portion of the computer's memory that is inaccessible to a user. The secure portion of code is used to make sure that the BIOS image to be programmed into the computer is compatible with the computer.

17 Claims, 3 Drawing Sheets

VIRUS RESISTANT AND HARDWARE INDEPENDENT METHOD OF FLASHING SYSTEM BIOS

BACKGROUND OF THE INVENTION

1. Field of the Invention

The present invention relates generally to the BIOS of a general purpose computer and more particularly to techniques for allowing the BIOS to be reprogrammed that are resistant to inadvertent or unauthorized reprogramming of the BIOS.

2. Description of Related Art

The BIOS (Basic In/Out System) is generally a piece of software or code stored in a specific memory area of a computer. The computer uses the BIOS to get itself started properly when turned on. The BIOS may be used, from time to time, thereafter to help manage data transactions between hardware and programs.

Many electronic devices that do not operate like standard personal computers have begun to incorporate BIOS into their circuitry. For example, a modem may include an 80C186 microprocessor which utilizes a BIOS. Furthermore, CD and tape writers, laser and ink jet printers which contain microcontroller or microprocessor based computing circuitry have begun to incorporate a BIOS of some kind for use at start up to get the device operating and running when turned on.

Some PC (personal computer) operating systems (e.g., Linux, NT) have dispensed with the services of the BIOS while the system is running, but they all require and rely on the BIOS when the PC is started or turned on. A PC chipset (the majority of interconnect and control circuitry of a PC found within a few chips on a PC motherboard) has many configurable options, such as memory and bus timing, port configuration and so on, which are configured by the BIOS at start up. However, an inoperable computer results if the options are not configured correctly by the BIOS at start up.

At one time the BIOS were programmed into ROM chips on the PC mother board. The BIOS ROM chips could not be reprogrammed, but instead had to be replaced with a newly programmed BIOS ROM chip.

As ROM chips became programmable, EEPROM's, and Flash ROMS began to be used for BIOS chips. In particular, Flash ROMs can be programmed without being removed from a circuit board. This is useful in the personal computer industry because a Flash ROM BIOS chip ("Flash BIOS") can be reprogrammed ("flashed") and upgraded with new data without opening the chassis of the personal computer.

At present, there are various computer systems that allow the BIOS code to be flashed. Before a presently existing computer system flashes the system BIOS, the flash (reprogramming) application generally verifies that the BIOS image to be programed/flashed into the Flash BIOS is a correct size or has a correct file name for the computer, but in present systems it is not possible to actively check the BIOS image to make sure it will be compatible with the computer it will be loaded into. Furthermore, at present it is not possible to program a Flash ROM BIOS in a "protected programming" mode of the computer's operating system such as while operating in Windows '95 or '98. Thus, ROM BIOS flashing must be performed in a "real" mode operating system such as MS-DOS. A drawback of this technique of flashing the BIOS is that the verification code required for flashing the ROM BIOS exists as an executable file that may be found and disassembled by a hacker. The hacker could easily discern sufficient information from the disassembled code to create a flash ROM BIOS image that will be accepted as a BIOS image and render the computer unusable.

There are some other serious problems associated with the ability of a computer user to Flash his own computer's BIOS. For example, suppose a user wanted to upgrade the information in his Flash BIOS. He would have to obtain a new BIOS program from the computer manufacturer, the worldwide web, or another source. Then to perform the Flash BIOS upgrade, the user would initiate a "burner" program on his PC. That is, the burner program will use circuitry built into the PC's mother board (provided it supports flash upgrading) and erase the existing data/information in the Flash BIOS chip and then program or load the new BIOS data/information into the chip. This is all fine and good unless an inappropriate BIOS program obtained and then loaded into the Flash BIOS is used. If an inappropriate BIOS program was loaded into the BIOS chip, the user's computer would be rendered inoperable.

Another problem, as discussed above, is that a hacker could write a computer virus that could initiate the burner software and Flash the BIOS of an unsuspecting user's computer thereby rendering the computer inoperable.

Thus, there is a need for a computer system that resists having its BIOS flashed so that an incompatible BIOS program, other data, or no data is left in the memory area where the BIOS program is kept. Furthermore, there is a need for a computer system that has a virus resistant and hardware independent method for flashing the BIOS so that only a system compatible BIOS code can be flashed into the Flash BIOS chip.

SUMMARY OF THE INVENTION

In one embodiment of the present invention a computer system comprises a hard disk drive where a BIOS image can be stored on a magnetic media. If a user wants to reprogram a ROM BIOS part with the BIOS image, a utility program is executed. The utility program generates a software system management interrupt in order to trigger a handler program. The handler program is stored in the system management memory portion of RAM which is inaccessible to a user. The handler program checks the BIOS image for a specific code to determine whether the BIOS image is a certified BIOS image that is certified for the operating computer system. If the handler program determines that the BIOS image is certified, then it will reprogram the ROM BIOS part with the certified BIOS image.

BRIEF DESCRIPTION OF THE DRAWINGS

Various objects and advantages of this invention will become apparent and more readily appreciated from the following description of the presently preferred exemplary embodiments, taken in conjunction with the accompanying drawings of, of which.

DETAILED DESCRIPTION OF THE PRESENTLY PREFERRED EXEMPLARY EMBODIMENTS

Exemplary embodiments of the present invention will now be described. The invention may be embodied in many different forms and should not be construed as limited to the embodiments set forth herein; rather, these embodiments are provided so that this disclosure will be thorough and complete, and will fully convey important aspects of the present invention to those skilled in the art.

Figure 1:
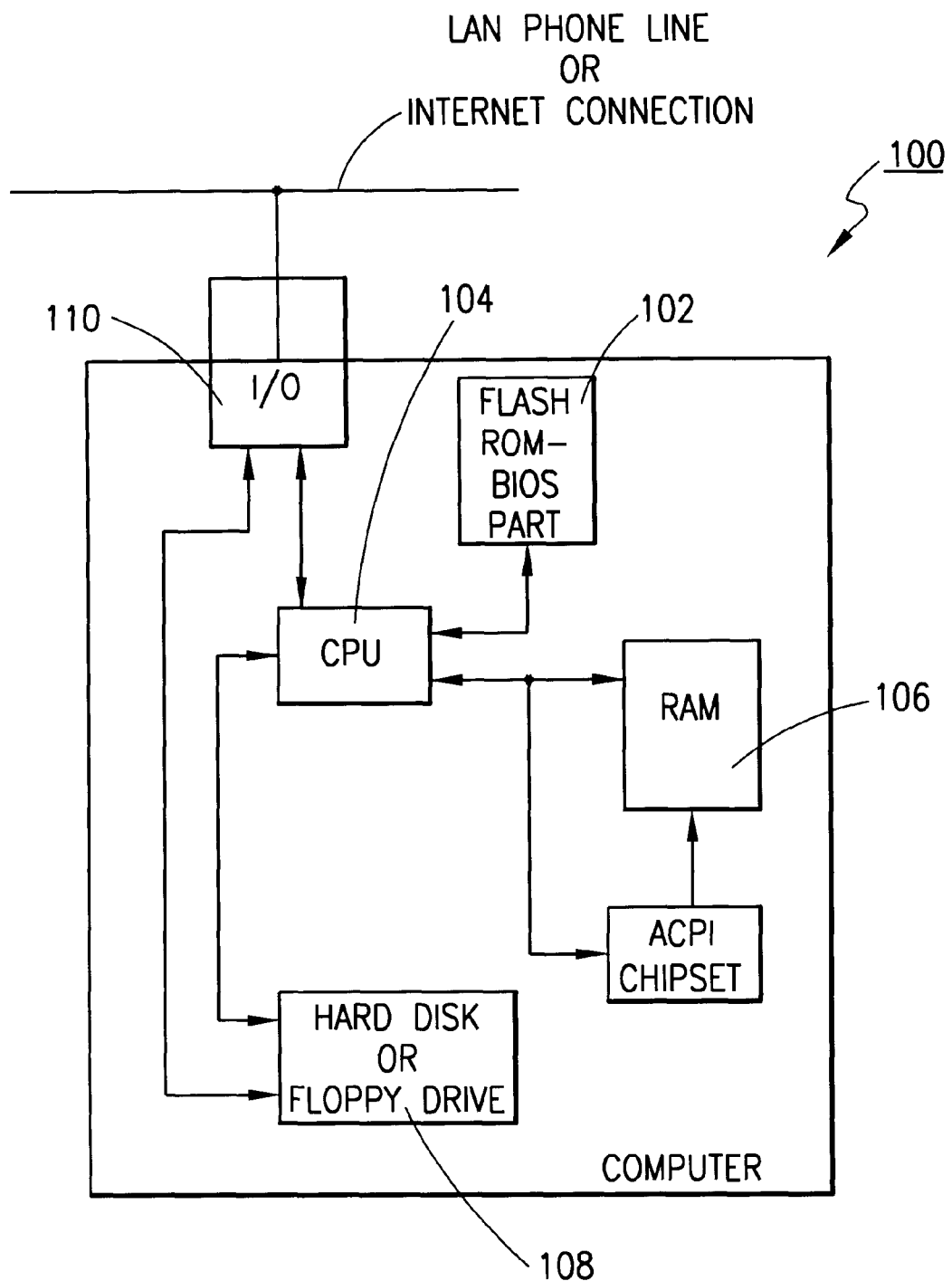
FIG. 1 depicts an exemplary computer system that may incorporate an exemplary embodiment of the present invention.

Referring first to FIG. 1, selected portions of a general computer or personal computer (PC) 100 are shown that incorporates an exemplary embodiment of the present invention. Upon start up of the PC 100, the BIOS program, stored in a Flash ROM BIOS memory 102, is interpreted by the central processing unit ("CPU") 104. The BIOS is a piece of code that the PC 100 uses to get itself started when the computer is switched on. In some cases, the BIOS is further utilized to manage data transactions between hardware and programs. Hardware that is "set up" by the BIOS may include RAM memory 106, hard or floppy disk drives 108, input/output circuitry 110, and modem circuitry 112.

There may be times that a user wants to upgrade or reprogram the flash BIOS 102. Furthermore, a malicious hacker may attempt to write a 'virus' program that is directed to flashing the Flash BIOS 102 with a new invalid or corrupted BIOS program or BIOS image. In either case, an exemplary embodiment of the present invention will help prevent the user or the virus program from flashing a system BIOS with a 'non-certified' or non-compatible BIOS image. By preventing the BIOS from being flashed with an invalid, uncertified or incompatible BIOS program, computer repair costs are avoided and the computer 100 operates as a more reliable system to the user.

In one embodiment of the present invention, all the hardware dependent code that is utilized to flash the ROM BIOS is kept in an inaccessible SMM (system management memory) segment. Additionally, prior to copying the hardware dependent code to a SMM segment of memory, the code only exists in a disassembly resistant compressed format. Furthermore, an exemplary computer system will flash the BIOS only during an SMI (system management interrupt) mode, thus, it is possible to reprogram or flash the ROM Bios when the computer system is operating in a real mode (e.g., a MS-DOS mode), a virtual Intel 8086 mode or a protected mode (e.g., MS-DOS with a virtual memory manager such as EMM 386.exe, while operating in Windows '95, '98, NT).

Preferably, the present invention makes it extremely difficult for a hacker or user to determine how to update or flash the current flash ROM BIOS because the necessary code required to flash the BIOS runs only during a System Management Interrupt ('SMI') mode. There is essentially extremely limited mechanisms to enable a hacker or user to step through the code operating during a SMI mode to figure out what the code does to flash the ROM BIOS. The code is operated in a portion of the computer memory that is hidden to other programs; the code that flashes the BIOS is only 'visible' to the BIOS when the computer is processing an SMI.

Furthermore, the firmware within the computer circuitry that is used to flash the Bios requires the BIOS image (the new BIOS data that a user wants to have flashed into the existing Flash ROM BIOS part) to have a means for verifying that the BIOS image is compatible with the computer it is about to be placed into. The means for verification could be a checksum added to the end, middle or other location in the BIOS image. The means for verification could be that the BIOS image comes in an encrypted format that is understood by the specific model of computers for which it can be installed in. The intent of the means for verifications is so that the computer will not allow its BIOS to be flashed unless the BIOS image can be verified or certified as a valid, certified or authentic BIOS image for the particular computer model.

Referring again to FIG. 1, a BIOS image that may be later flashed into the ROM BIOS 102 can be provided and stored in a computer 100 a variety of ways. The image can be provided via a floppy drive, hard drive, zip drive 108 or other data storage medium. Furthermore, the BIOS image could be downloaded from a global network (such as the Internet), retrieved from a LAN or WAN, or provided via a phone line modem or other external data connection via an I/O Port 110.

Figure 2:
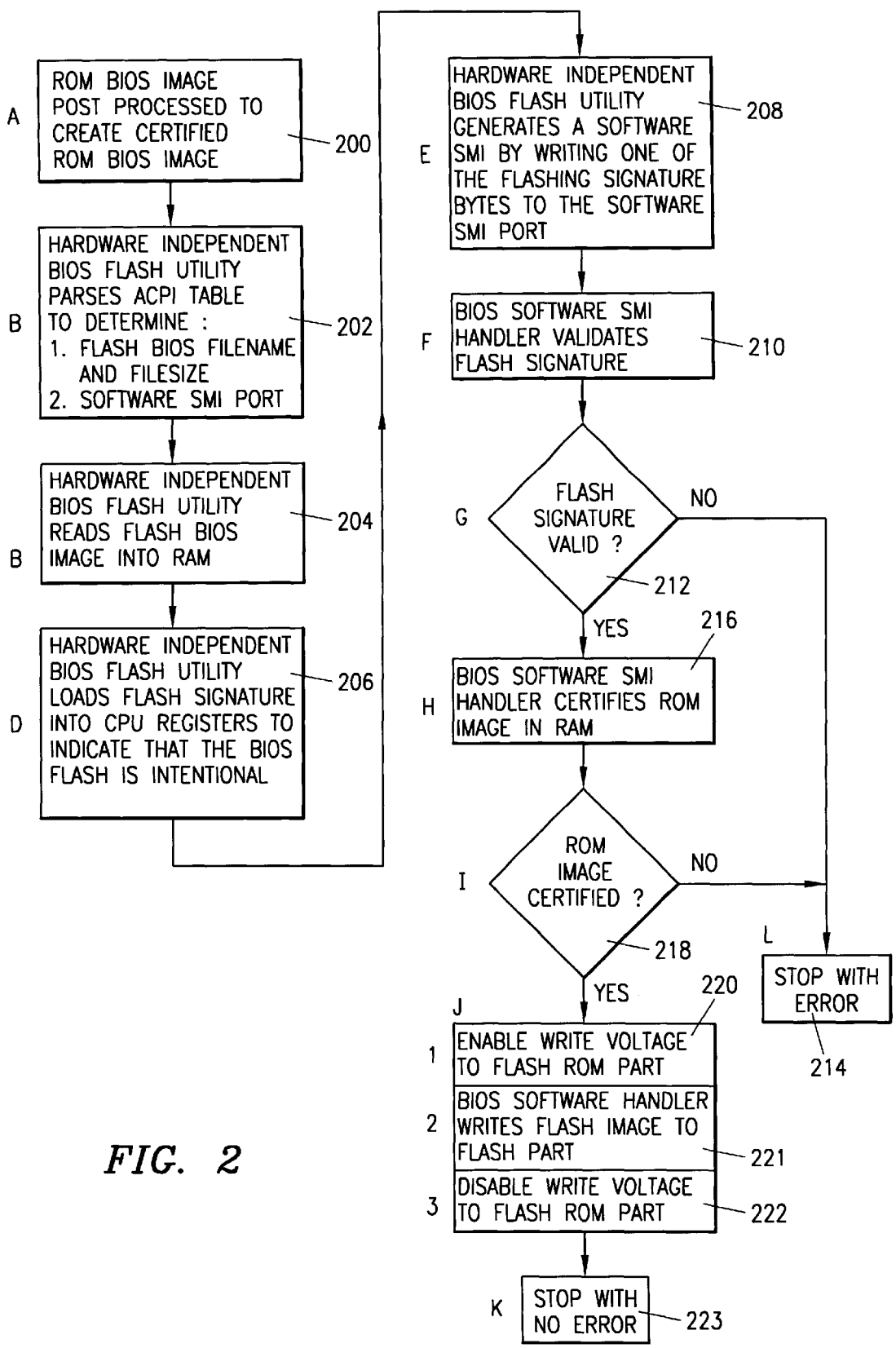
FIG. 2 depicts a flow chart of an exemplary method for flashing ROM BIOS in accordance with the present invention.

FIG. 2 depicts a flow chart describing both an exemplary process of creating a certified ROM BIOS image and exemplary steps for updating or flashing the ROM BIOS part. An exemplary process for creating a certified BIOS image begins at step 200 wherein a ROM BIOS image is processed to create a certified ROM BIOS image. There are a variety of ways to process a BIOS image to certify it. Three exemplary techniques for certifying a ROM BIOS image are presented, but one of ordinary skill in the art could discern other certification techniques. One technique for creating a certified BIOS image is to encrypt the entire BIOS image using a private key known only to the SMI handler software. The ROM image, can be decrypted with the private key and then it can be established that the decrypted image is a certified image before being flashed into the ROM BIOS. If the ROM image cannot be decrypted with the private key, then it is certainly not certified. Each model of computer would contain a different private key, thus encrypted BIOS images could only be used in computer models having the correct private key in the SMI handler to decrypt the BIOS image.

A second technique for creating a certified BIOS image is to have a hidden check sum or cyclical redundancy check ('CRC') embedded into the BIOS image at an offset or predetermined code location that is only known by the SMI handler. The offset could be stored in the SMI handler during a manufacturing process. It is not important what the offset or location is except that the SMI handler code knows where to look in a BIOS image for the certification information.

A third technique for creating a certified ROM BIOS image that a user may want to flash into his computer's flash ROM BIOS part 102 is to attach or append an encrypted checksum or cyclic redundancy check ('CRC') to the end of the BIOS image using a private key. The private key would be known only to the SMI handler software of similar computer models. The SMI handler would aid in decrypting the checksum or CRC to determine if the BIOS image is a certified image and appropriate to be loaded into the ROM BIOS part of the computer. Once a certified BIOS image is established for the particular computer model, then the certified BIOS image can be provided by the manufacturer of the computer to users for their computers. The user's computer, upon receipt of the BIOS images, will have the means to determine whether a received BIOS image is certified or valid as an appropriate BIOS for the particular computer. Beginning at step 202, an exemplary technique for determining whether the BIOS image is an appropriate certified BIOS image and the steps of flashing the certified BIOS image into the ROM BIOS part is disclosed.

In some cases a manufacturer will provide a software file or files with a plurality of BIOS images. Each BIOS image being intended for a different computer model. In steps 202 and 204 the computer's firmware or preloaded computer software must determine which one of a plurality of BIOS images is the appropriate BIOS image for being loaded into the RAM BIOS part of the particular computer.

At step 202 a hardware independent BIOS flash utility gathers information from an ACPI table found in an ACPI supporting BIOS, but created by the resident BIOS code at start up. In the preferred embodiment the filename, the file size and the software SMI port location is gathered from the ACPI table. The file name is preferably the name of the file where the BIOS image for the particular computer is found. The file size information is the size of the BIOS image file. The software SMI port is the I/O port location that generates a software SMI when written to.

In particular, an exemplary hardware independent flash utility searches the RAM memory addresses OEOOOOH through OFFFFFH for the ACPI table signature "RSD PTR." If the signature is not found, the utility displays an error message and terminates. If the signature is found, the application reads the following items from the ACPI table: the OEM Table ID in the Root System Description table (RSD) which is a field that contains the file information to derive the flash BIOS file name; 2) and the SMI port address in the Fixed ACPI Description Table. The SMI port address is the address of the SMI port that provides the SMI interrupt.

At step 204 the hardware independent BIOS flash utility reads the BIOS image found in the file name, specified in step 202, into preferably a contiguous block or continuous block of RAM memory. The CPU registers are set to indicate the location and size of the stored BIOS image.

At step 206, the hardware independent BIOS flash utility passes a flash signature or other data information into one or more CPU registers to indicate that a flash update is indeed requested, desired and intentional.

At step 208, the BIOS flash utility generates a software SMI by writing a code to the software SMI I/O port. The code could be all or a portion of the flash signature that was passed into one or more of the CPU registers in step 206. The result is that an SMI occurs. Flashing of the ROM BIOS can only occur in an exemplary embodiment during a software SMI event.

In step 210, the Software SMI handler begins operating and validates the flash signature. Again, the flash signature indicates that a flash update is requested, desired and intentional. If the software SMI handler determines that the flash signature is not valid, then the flash BIOS process is stopped and an error is displayed to the user at steps 212 and 214.

If the flash signature is valid at step 212, then the SMI handler proceeds to step 216 where the SMI handler utilizes a private key or other information only known to the SMI handler (as discussed in step 200) to determine whether the BIOS image is a certified BIOS image. A certified BIOS image is a BIOS image that is correct for the current computer system. By requiring the SMI handler to have a private key or other information to decrypt a portion of or otherwise determine that the BIOS image is a certified BIOS image, hackers and inexperienced computer users are thwarted from flashing a ROM BIOS part with an inappropriate BIOS image.

If the BIOS image in RAM is not certifiable by the software SMI handler, then the flashing processes is stopped and an error message is displayed in steps 218 and 214.

If the BIOS image, stored in RAM, is certifiable by the Software SMI handler in steps 216 through 218, then a write enable signal is provided to the ROM part in step 200. The write enable signal may be a general purpose I/O that has to be turned on or off. The general purpose I/O location would also have to be known only to the SMI handler code and should not be known or accessible in any other place in the computer so that it would be extremely difficult for a hacker to learn how to enable a signal to the ROM BIOS part and have them flashed.

Figure 3:
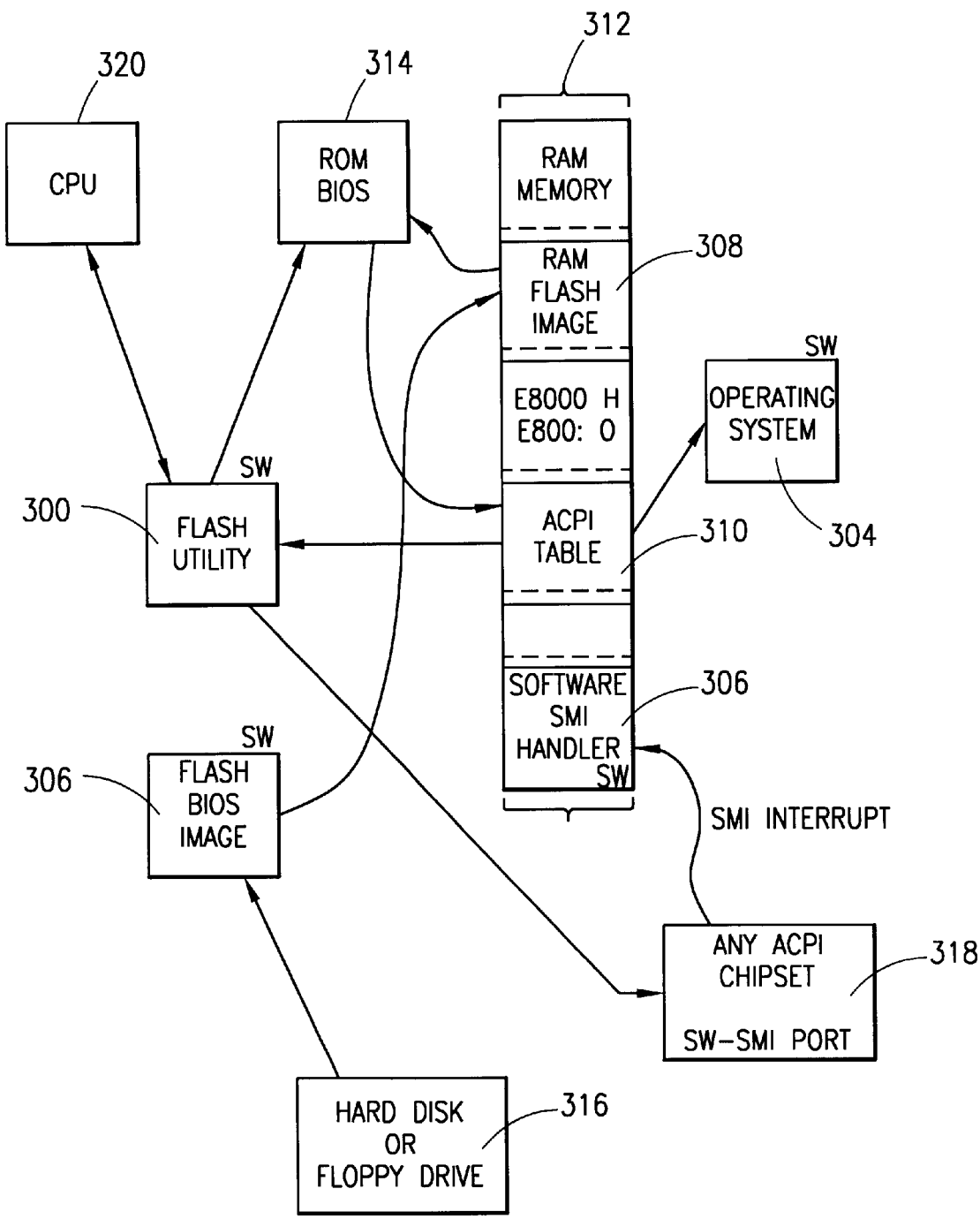
FIG. 3 depicts an exemplary diagram of hardware and software relationships in accordance with the present invention.

In step 221, the BIOS SMI handler writes the BIOS image to the ROM BIOS part (i.e., flashes the ROM BIOS part). The write enable signal is disabled or made inactive in step 222. At this point the BIOS image has been loaded into the ROM BIOS part in the place of the preexisting ROM BIOS code. In step 223, the process of flashing the BIOS ends without an error Referring now to FIG. 3, a general flow of data or information between various subsystems and software/firmware on and off a computer motherboard is shown for implementing an exemplary virus resistant ROM BIOS flashing method and invention.

It is noted that the flash utility 300, the flash image 310, the operating system 304, the software handler 306, the RAM flash image 308, and the ACPI table 310 are all software, firmware or data code.

In an exemplary embodiment, a user or virus program will request that the flash utility 300 be executed in order to have a new BIOS image 302 flashed into the present ROM BIOS part 314. The BIOS image 302 may have been stored in a storage media such as a harddisk or floppy drive 316. The flash utility 300 retrieves a needed BIOS file name and file size information from an ACPI table 310 stored in RAM Memory 312. The correct BIOS image 302 can then be retrieved from the storage media 316 and placed in a continuous block of RAM 308. The flash utility will then instruct an ACPI chipset 318 to provoke a software SMI interrupt, but only after the CPU provides a flash signature indicating that the request for flashing the BIOS is intentional. The software, SMI handler then determines whether the flash image stored in RAM 308 is a certified BIOS image. The certification is established via a secret encryption key or other secret data only known by the SMI software handler which is used to check the BIOS image for authenticity and certification.

Since the SMI handler only operates when a software SMI interrupt is applied; and since the SMI handler is stored in a user inaccessible part of RAM, it is extremely difficult for a hacker to determine the secret code or information required or used to certify a BIOS image. Thus, if the software SMI handler does not certify the BIOS image, then the ROM BIOS part cannot be flashed.

The exemplary embodiments thus establish a virus resistant method for flashing ROM BIOS. The embodiments have a need for a certified BIOS image that would be extremely hard for a hacker to create since the information is hidden in the software SMI handler. The software SMI handler code is substantially inaccessible to a user or hacker because it is located in a portion of memory which is a system management memory segment (SMM segment) and, in addition, only exists in a dissembly resistant compressed format when not being used.

Although various preferred embodiments of the invention and method have been shown and described, it will be appreciated by those skilled in the art that changes, both insignificant and significant, can be made to these embodi-

What is claimed is:

1. A computer system comprising:
   a hard disk drive for receiving and storing a BIOS image;
   a Flash ROM BIOS part adapted to be flashed with said BIOS image;
   a RAM memory for receiving and storing said BIOS image from said hard disk when said BIOS image is to be flashed into said Flash ROM BIOS part, said BIOS image including a flash signature and encoded information for verification that said BIOS image is compatible with a particular computer system;
   a utility program operable to generate a software SMI by writing at least part of said flash signature to an SMI port; and
   a software SMI handler program responsive to said software SMI for determining whether said BIOS image is a certified BIOS image for a particular computer system and on determination of a certified BIOS image, allowing said- BIOS image to be flashed into said Flash ROM BIOS part.

2. The computer system of claim 1, wherein said software SMI handler program further includes a code that is substantially inaccessible to a computer user.

3. The computer system of claim 1, wherein said software SMI handler can only be, accessed via a software-SMI interrupt.

4. The computer system of claim 1, wherein said BIOS image encoded information comprises at least an encrypted portion, said encrypted portion being decrypted by said software SMI handler program.

5. The computer system of claim 1, wherein said BIOS image encoded information comprises at least one of a CRC and a check sum.

6. The computer system of claim 1, wherein said software SMI handler program is a hardware independent program.

7. The computer system of claim 1, wherein said software SMI handler program is stored in a system management memory segment of memory.

8. The computer system of claim 1, wherein said software SMI handler program exists in a compressed format resistant to disassembly.

9. A method for flashing a ROM BIOS part in a computer system, said method comprising the steps of:
   determining a Flash BIOS file name and a Flash BIOS file size for a ROM BIOS to be flashed;
   determining a software SMI port location;
   placing a BIOS image having said determined Flash BIOS file name and said Flash BIOS file size into RAM, said BIOS image including encoded information for verification that said BIOS image is compatible with said computer system;
   using a flash BIOS signature to indicate that flashing said BIOS is intentional;
   generating a software SMI interrupt;
   in response to said software SMI, determining whether said flash BIOS signature is valid and, if valid, executing a specific code during said software SMI interrupt to determine on the basis of said encoded information whether said BIOS image is a certified BIOS image for said computer system; and
   flashing said ROM BIOS part if said BIOS image is determined to be said certified BIOS image.

10. The method for flashing said ROM BIOS part in said computer system of claim 9, wherein said BIOS image having said determined Flash BIOS file name and said Flash BIOS file size is placed in a continuous block of RAM.

11. The method for flashing said ROM BIOS part in said computer system of claim 9, wherein said step of executing a specific code includes a step of decrypting a predetermined encrypted portion of said BIOS image.

12. The method for flashing said ROM BIOS part in said computer system of claim 9, wherein said step of executing a specific code includes a step of checking at least one of a check sum and a CRC found in a predetermined portion of said encoded information of said BIOS image.

13. A method for reprogramming a ROM BIOS part in a computer system, said method comprising the steps-of:
   determining whether a user intentionally initiated a ROM BIOS part reprogramming;
   after determining that initiation of a ROM BIOS part in the computer system was intentionally initiated, establishing that a ROM BIOS image is a certified ROM BIOS image that is compatible with said computer system; and
   reprogramming said ROM BIOS part if said ROM BIOS image is established to be a certified ROM BIOS image for said computer system.

14. The method for reprogramming said ROM BIOS part in a computer system of claim 13, wherein said step of determining utilizes a program initiated by a software SMI to make the determination.

15. The method for reprogramming said ROM BIOS part in a computer system of claim 13, wherein said step of establishing comprises a step of running software stored in a system management memory segment of a RAM in response to a software SMI.

16. The method for reprogramming said ROM BIOS part in a computer system of claim 13, wherein said step of establishing comprises a step of decrypting at least a predetermined portion of said BIOS image with a private key.

17. The method for reprogramming said ROM BIOS part in a computer system of claim 13, wherein said step of reprogramming said ROM BIOS part includes a step of flashing said ROM BIOS part with said ROM BIOS image.

* * * * *